April 7, 1931.　　　E. O. HAMREN　　　1,799,228
MORTAR MIXER
Filed Nov. 8, 1929　　　2 Sheets-Sheet 1

Inventor:
Eric O. Hamren,
By Cromwell, Greist & Warden
Attys

April 7, 1931. E. O. HAMREN 1,799,228
MORTAR MIXER
Filed Nov. 8, 1929 2 Sheets-Sheet 2
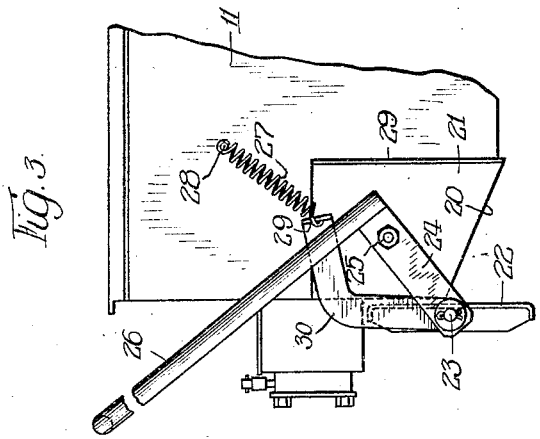
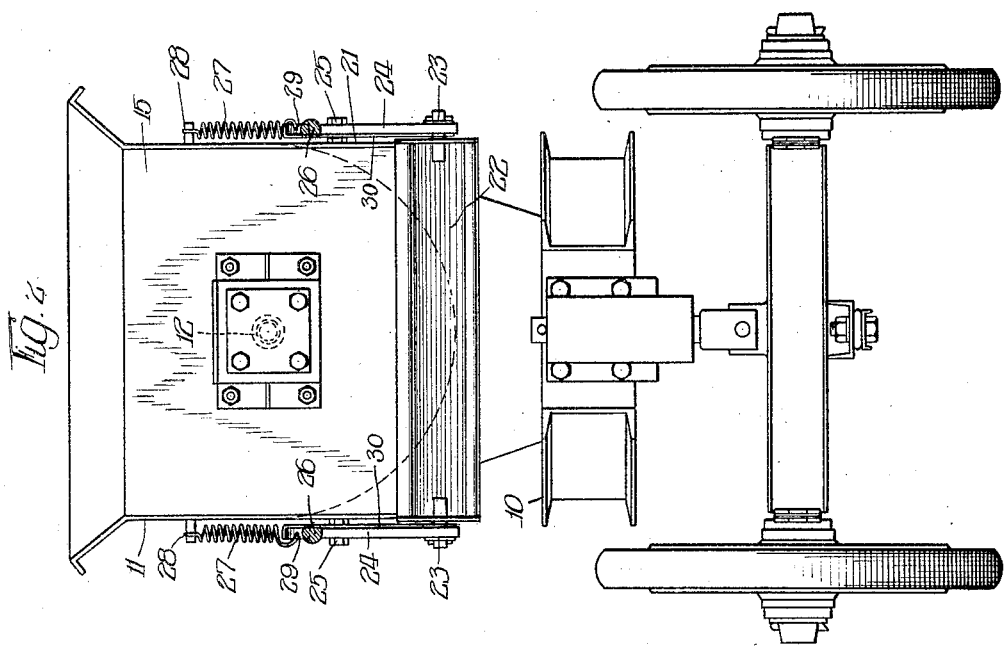
Inventor
Eric O. Hamren,
By Cromwell, Greist & Warden
Attys Patented Apr. 7, 1931

1,799,228

UNITED STATES PATENT OFFICE

ERIC O. HAMREN, OF OSHKOSH, WISCONSIN, ASSIGNOR TO LEACH COMPANY, OF OSHKOSH, WISCONSIN, A CORPORATION OF WISCONSIN

MORTAR MIXER

Application filed November 8, 1929. Serial No. 405,556.

This invention has to do with mortar mixers, and is particularly concerned with the means employed in such mixers for discharging the mortar.

The principal object of the invention is to provide an improved discharge gate which is easy to operate, shuts off the flow of mortar instantly with a clean cutting action when moved into closed position, assumes an unobstructive position when opened, is inexpensive to construct and is dependable in operation.

Other objects and advantages of the invention will be apparent to those skilled in the art upon a full understanding of the construction arrangement and operation of the improved discharge gate.

In order that the invention may be readily understood, one form of the same is presented herein, but it will of course be appreciated that such form has been selected primarily for the purpose of exemplification and that the invention is susceptible of embodiment in other structurally modified forms coming equally within the scope of the appended claims.

In the accompanying drawings:

Fig. 2 is a rear end view of the mixer, with the operating handle shown in section; and Fig. 3 is a fragmentary side view, corresponding to a portion of Fig. 1, showing the discharge gate in open position.

Figure 1:
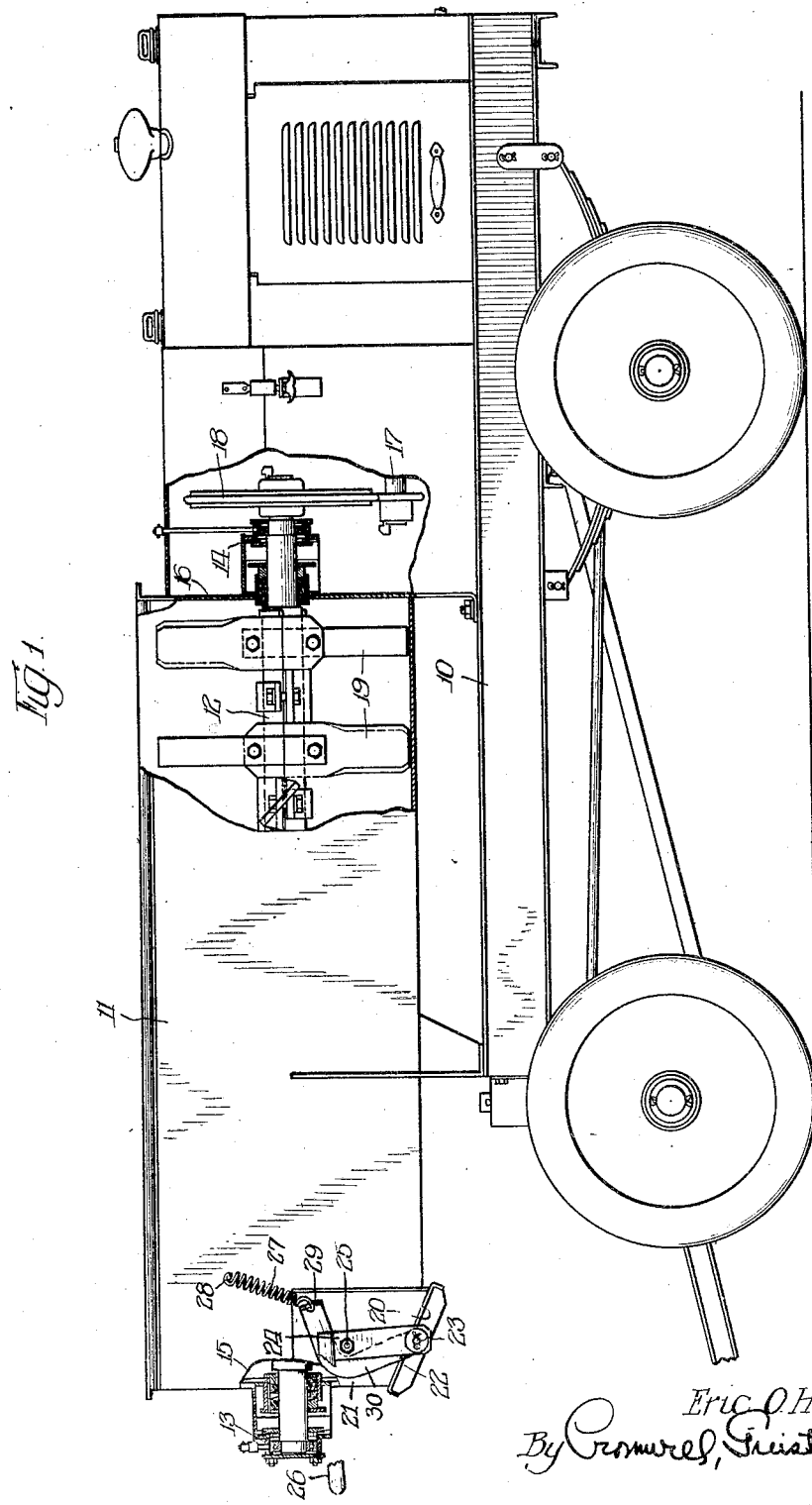
Fig. 1 is a partially sectioned side view of a mortar mixer equipped with the discharge gate of the invention.

The mixer shown in the drawings is mounted on a wheeled under-carriage 10 and includes a long U-shaped trough 11 which is closed at both ends. A shaft 12 extends longitudinally of the trough through the center of the same and is journaled in housed bearings 13 and 14 which are mounted on the outer faces of the ends 15 and 16 of the trough. The shaft is rotated by a motor 17, through suitable reduction means 18, and carries a number of mixing blades 19 which project radially from the shaft at intervals longitudinally thereof. The blades are arranged at such angles as to both mix the mortar thoroughly and work it toward the end 15 of the trough.

The mortar, after being mixed in the trough, is discharged therefrom through a transversely elongated rectangular opening 20. The discharge opening is located in the bottom of a straight side-walled section 21 which is positioned between the trough proper and the end 15, and is disposed with the edges of the opening in a plane which is inclined slightly to the horizontal. The discharge opening is normally closed by a transversely elongated rectangular gate 22 which laps the edges of the opening a little and is pivoted at 23 to the lower ends of a pair of depending links 24, which links are in turn pivoted at 25 to the opposite sides of the end section 21 of the trough and are rigidly attached above the points 25 to the opposite side portions of a horizontally disposed U-shaped operating handle 26. The handle, which swings from the closed position shown in Fig. 1 to the open position shown in Fig. 3, about the pivot points 25, is urged to assume and remain in the closed position by the tension of a pair of coil springs 27 which are attached at 28 to the opposite sides of the trough and are attached at 29 to the upper ends of a pair of curved links 30 which are pivoted at 23 to the ends of the gate. The links 30 curve about the pivots 25, and the springs 27 tend to hold the gate in both its closed and open positions.

When some or all of the mixed mortar in the trough is to be dumped into a wheelbarrow or other receptacle, the person operating the mixer swings the handle 26 upwardly against the yielding resistance of the springs 27, which action shifts the gate 22 in a generally horizontal direction out from under the opening 20 and allows the gate to tilt into an unobstructive vertically disposed position in lapped relation to the lower portion of the end 15 of the trough, as clearly shown in Fig. 3, in which position it is held by the reverse action of the springs 27.

When enough of the mixed mortar has been discharged, the operator swings the handle 26 downwardly, causing the gate 22, which is guided in its movement by the edges of the opening 20, to shear across such opening and abruptly cut off the flow of the mortar. The gate, when shifted into its closed position, provides a fluid-tight closure for the opening, the centrally pivoted form of mounting for the gate serving to equalize the wedging pressure of the gate against the edges of the opening at all points about the periphery of the latter.

The novel arrangement of the opening 20 with respect to the adjacent end 15 of the trough, together with the novel construction and operation of the coacting gate 22, permits of a rapid discharge, allows the end of the mixing blade shaft at the discharge end of the trough to be journaled beyond such end rather than within the trough, and tends to divert the flow of the mortar away from the shaft bearing at the discharge end.

While the mixer has been referred to herein as a "mortar" mixer, it will of course be appreciated that the same may be used for mixing compositions other than mortar, the invention residing in the novel features of construction, arrangement and operation apart from the particular use to which the mixer may be put.

I claim:

1. In a mixer, a U-shaped trough having closed ends and a straight side-walled section adjacent one end, a rotary mixing device positioned in the trough in bearings located outside of the latter, a transversely elongated opening in the bottom of the straight side-walled section of the trough disposed with its edges in a plane inclined slightly to the horizontal, links pivoted to the opposite sides of the trough above the ends of the opening, a flat gate beneath the opening pivoted to the lower ends of the links, a U-shaped handle about the adjacent end of the trough connected with the links for swinging the latter in unison to shift the gate bodily out of register with the opening, and spring means for normally maintaining the gate in wedged association with the edges of the opening.

2. In a mixer, a U-shaped trough having closed ends, a straight side-walled section adjacent one end constituting the closure for that end, a rotary mixing element positioned in the trough, an opening in the bottom of the straight side-walled section of the trough, a gate connected with the straight side-walled section of the trough beneath the opening in the bottom of the latter, and a handle connected with the gate for moving the latter into and out of register with the opening.

3. In a mixer, a U-shaped trough having closed ends, a straight side-walled section adjacent one end constituting the closure for that end, a rotary mixing element positioned in the trough, a transversely elongated opening in the bottom of the straight side-walled section of the trough, arms pivoted to the opposite sides of the trough above the ends of the opening, a transversely elongated gate beneath the opening connected to the lower ends of the arms, and a handle connected with the gate for swinging the latter into and out of register with the opening.

4. In a mixer, a U-shaped trough terminating at one end in a straight side-walled section the full width of the trough, a rotary mixing device positioned in the trough, a transversely elongated opening in the bottom of the straight side-walled section of the trough disposed with its edges in a plane inclined slightly to the horizontal, links pivoted to the opposite sides of the trough above the ends of the opening, a flat gate beneath the opening pivoted to the lower ends of the links, and a U-shaped handle about the adjacent end of the trough connected with the links for swinging the latter in unison to shift the gate bodily out of register with the opening.

In witness whereof I have hereunto subscribed my name.

ERIC O. HAMREN.